United States Patent [19]

Kageyama et al.

[11] 4,110,558
[45] Aug. 29, 1978

[54] DATA TRANSMISSION SYSTEM

[75] Inventors: Satoshi Kageyama; Kunihiko Sekiya, both of Yokohama, Japan

[73] Assignee: Tokyo Shibaura Electric Co., Ltd., Kawasaki, Japan

[21] Appl. No.: 764,073

[22] Filed: Jan. 31, 1977

[30] Foreign Application Priority Data

Jan. 30, 1976 [JP] Japan .................................. 51-8390

[51] Int. Cl.² ............................................. H04L 7/00
[52] U.S. Cl. ................................................ 178/69.1
[58] Field of Search ............. 178/53, 69.1; 179/2 DP, 179/15 BS, 15 BV; 325/4; 343/175, 179; 340/146.1 BE, 146.1 C, 146.1 D; 358/264

[56] References Cited

U.S. PATENT DOCUMENTS

| | | | |
|---|---|---|---|
| 3,006,999 | 10/1961 | Mason ................................... | 358/264 |
| 3,534,264 | 10/1970 | Blasbalg et al. ................. | 179/15 BV |
| 4,027,243 | 5/1977 | Stackhouse et al. ................... | 343/179 |

*Primary Examiner*—Benedict V. Safourek

*Attorney, Agent, or Firm*—Oblon, Fisher, Spivak, McClelland & Maier

[57] ABSTRACT

A data-transmission system using a continuous ARQ system, wherein a block (word) synchronization code is transmitted through a transmission line from a transmitter to a receiver repeatedly at a predetermined time interval, until the transmitter receives a signal (ACK) denoting the detection of the synchronization code from the receiver. Upon receipt of the synchronization code detection signal, the transmitter issues data blocks each having a fixed length to the receiver continuously from the point of time at which the succeeding synchronization code is to be transmitted. In the invention a predetermined number of test data blocks are further transmitted to the receiver in succession to the synchronization code. The receiver examines a block error rate concerning the test data blocks and supplies the transmitter with not only the synchronization code detection signal but also a data rate-specifying signal. The transmitter delivers data at a rate dependent on the data rate-specifying signal.

3 Claims, 15 Drawing Figures

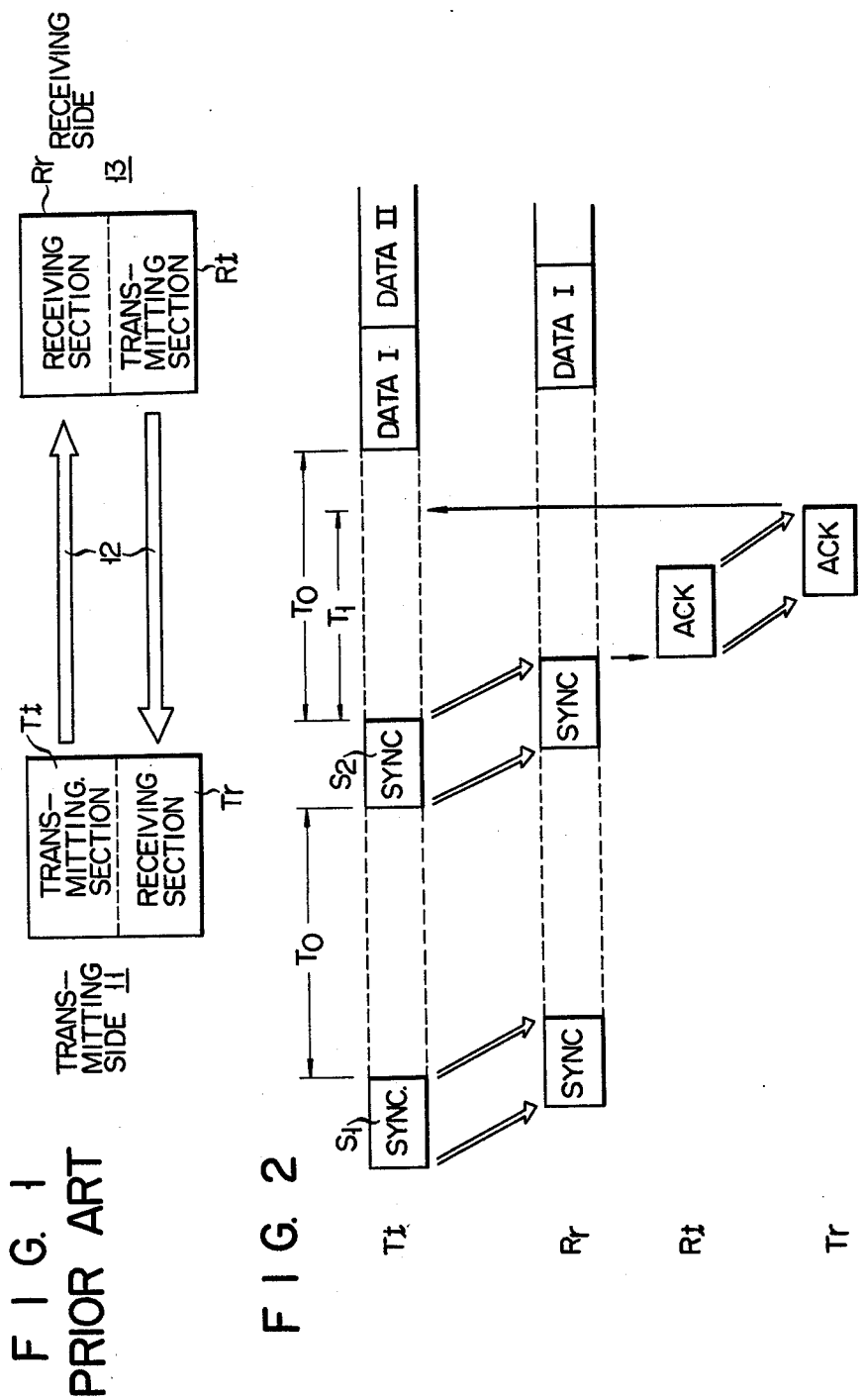

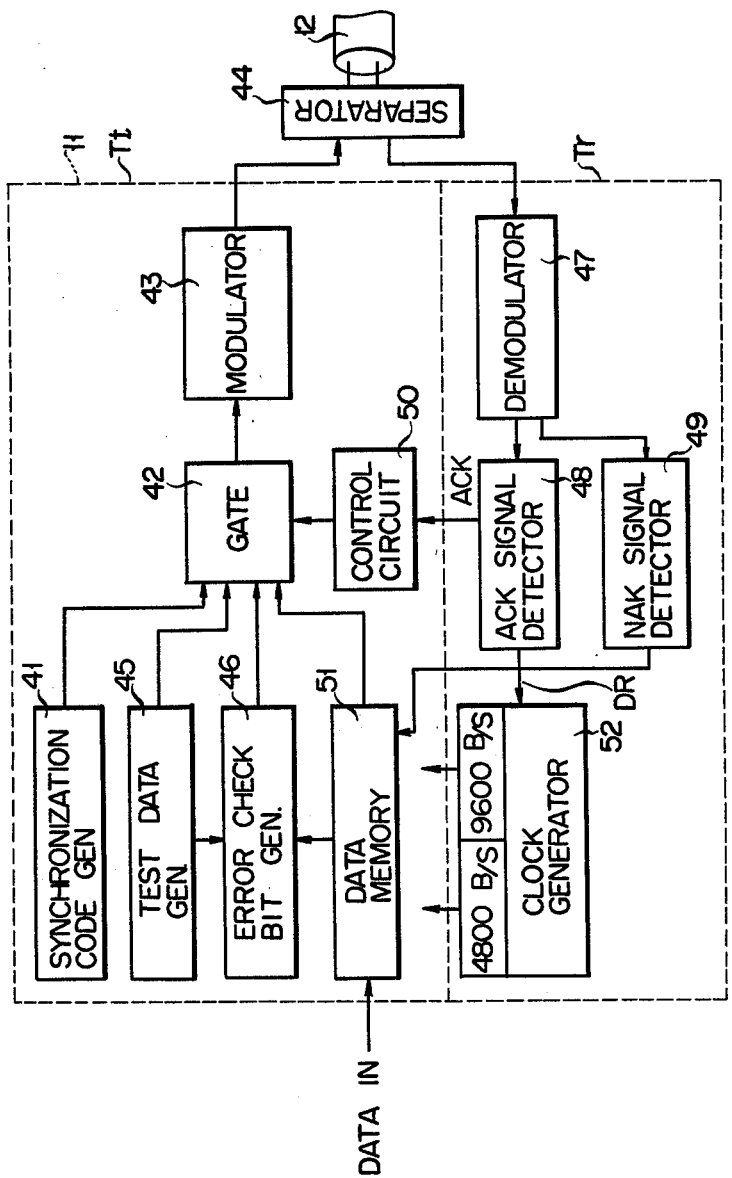
F I G. 11

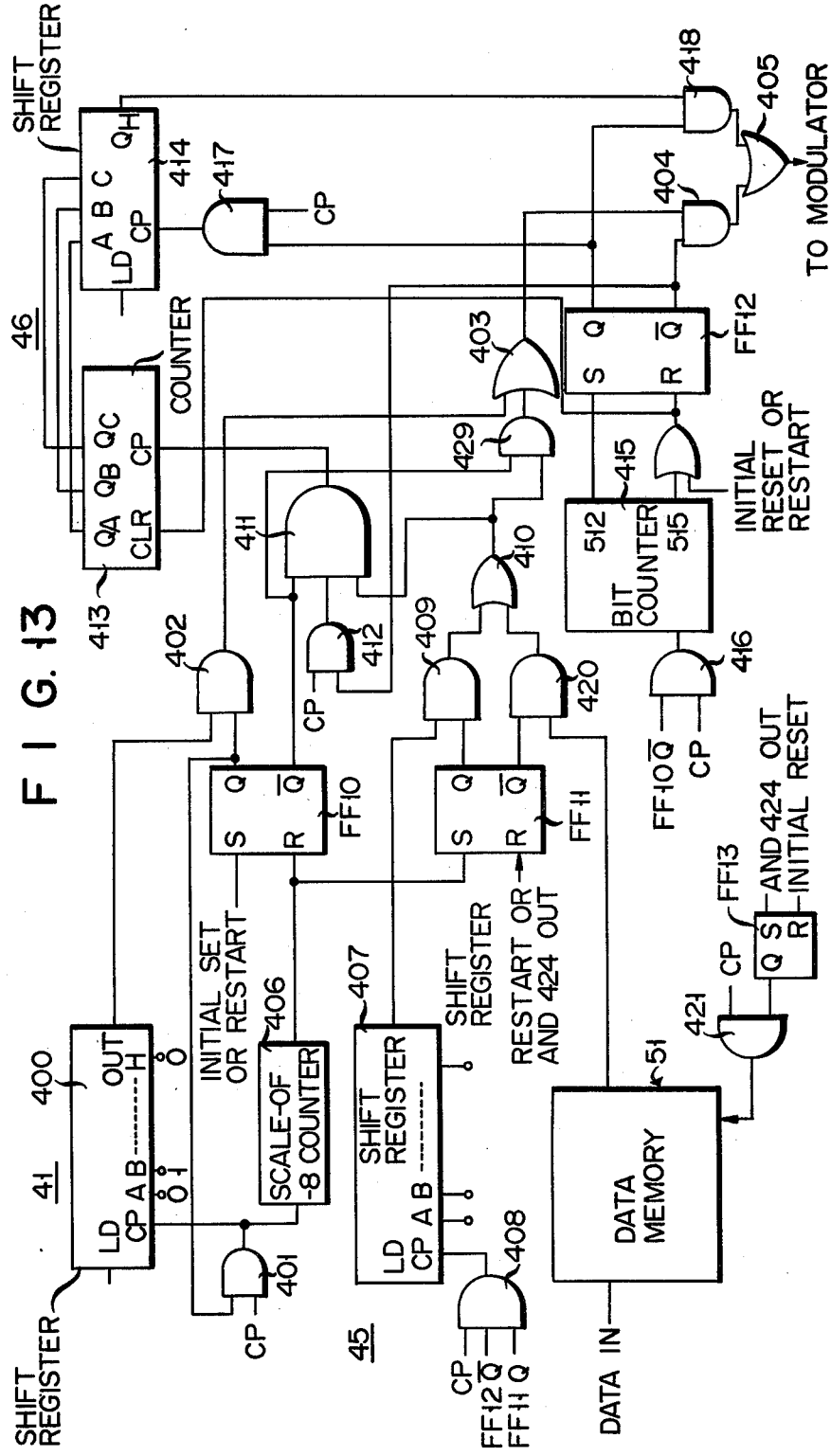
F I G. 13

DATA TRANSMISSION SYSTEM

BACKGROUND OF THE INVENTION

This invention relates to a data-transmission system and more particularly to a data-transmission system using a continuous automatic repeat request (abbreviated as "ARQ") system.

Known systems for controlling errors in data transmission include the ARQ type in which an error concerning data blocks delivered from a transmitter are detected by a receiver, and the transmitter is demanded to retransmit the data block.

With one form of the ARQ type which is referred to as "a continuous ARQ system," data blocks are continuously sent forth from the transmitter to the receiver. Where an erroneous data block is detected by the receiver, then the transmitter retransmits to the receiver the data block corresponding to the erroneous data block and the succeeding series of data blocks.

With one of the known data-transmission systems, data blocks are sent forth from the transmitter to the receiver in succession to a plurality of synchronization codes each formed of a plurality of bits in order to establish a block synchronization between the transmitter and receiver. With this prior art data-transmission system, synchronization can not be established, unless any of the plural synchronization codes is detected by the receiver. In such case, the receiver fails to be supplied with any data.

Where, with the continuous ARQ system, transmission channels are of high quality, a higher data rate is more efficient due to transmission time being shorted accordingly. Where, however, the transmission channels are degraded, then a higher data rate will unavoidably make it necessary to retransmit the same data more often than otherwise. On the whole, therefore, a longer transmission time will have to be consumed than when a data rate is low.

SUMMARY OF THE INVENTION

It is accordingly an object of this invention to provide a continuous ARQ data-transmitting system capable of effectively establish synchronization.

Another object of the invention is to provide a continuous ARQ data-transmission system enabling a data rate to be selectively changed according to the current quality of transmission channels.

According to one aspect of this invention, there is provided a data-transmission system in which forward signals including synchronization codes and data blocks are transmitted from a transmitter to a receiver and a backward signal including a synchronization code detection signal are transmitted from the receiver to the transmitter through a transmission channel subject to variations in transmission delay, the improvement comprising: means for transmitting synchronization codes repeatedly at a constant time interval from the transmitter to the receiver until the transmitter detects a synchronization code detection signal delivered from the receiver; means responsive to detection of an error-free synchronization code at the receiver for transmitting a synchronization code detection signal from the receiver to the transmitter; and means responsive to detection of the synchronization code detection signal at the transmitter for commencing data transmission to the receiver starting with the point of time at which the succeeding synchronization code is to be transmitted.

Further according to another aspect of this invention, there is provided a data-transmission system in which forward signals including synchronization codes and data blocks are transmitted from a transmitter to a receiver and a backward signal including a synchronization code detection signal is transmitted from the receiver to the transmitter through a transmission channel subject to variations in transmission delay, the improvement comprising: means for transmitting synchronization codes repeatedly at a constant time interval from the transmitter to the receiver until the transmitter detects a synchronization code detection signal delivered from the receiver; means for transmitting a plurality of test data blocks each including a test data and error check bits during the time interval between two adjacent synchronization codes from the transmitter to the receiver; means responsive to detection of an error-free synchronization code at the receiver for transmitting a synchronization code detection signal to the transmitter; means responsive to detection of the synchronization code detection signal at the transmitter for transmitting data blocks to the receiver starting with the point of time at which the transmitter transmits the succeeding synchronization code; error rate-detecting means for detecting an error rate concerning test data blocks received by the receiver; means responsive to the error rate-detecting means for transmitting a data rate-specifying signal from the receiver to the transmitter; and means responsive to detection of the data-rate-specifying signal at the transmitter for controlling the rate at which data are transmitted from the transmitter to the receiver.

BRIEF DESCRIPTION OF THE DRAWING

This invention can be more fully understood from the following detailed description when taken in conjunction with the accompanying drawings, in which:

FIG. 1 shows a prior art data-transmission system;

FIG. 2 is a diagram for explaining a data-transmission system according to a first embodiment of this invention;

FIG. 11 is a schematic block diagram of a data-transmitting section of the second embodiment;

FIG. 13 is detailed block diagram of one part of the data-transmitting section of FIG. 11;

DESCRIPTION OF THE PREFERRED EMBODIMENTS

Figure 3:
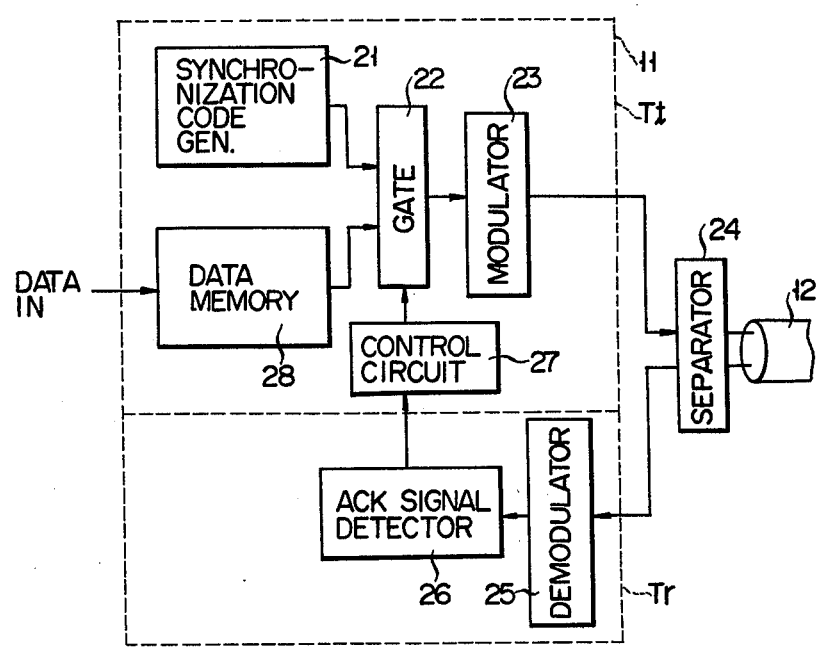
FIG. 3 is a schematic block diagram of a transmitting section of the data-transmitting system according to the first embodiment of the invention.
Figure 4:
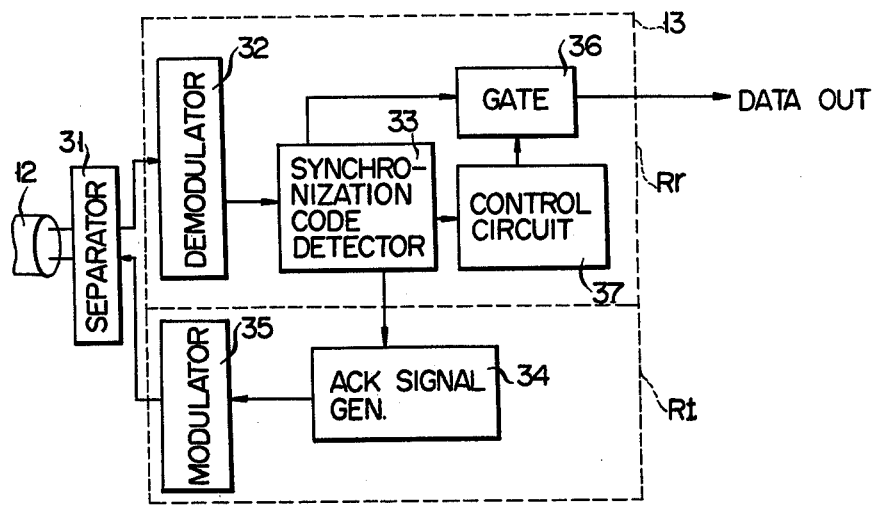
FIG. 4 is a schematic block diagram of a receiving section of the data-transmitting system according to the first embodiment of the invention.

With a prior art data-transmission system of FIG. 1, the transmitting section $T_t$ of the transmitting side 11 transmits a forward signal including synchronization codes and data blocks to the receiving section $R_r$ of the receiving side 13 through a transmission line 12 such as a subscribers telephone line which is subject to variations in transmission delay each time the transmission line is set. When detecting a synchronization code, the receiving section $R_r$ sends a synchronization code detection signal or ACK (acknowledge) signal back to the transmitting side 11. When an error is detected concerning a data block transmitted after establishment of synchronization, then the receiving section $R_r$ issues to the transmitting section $T_t$ a NAK (negative acknowledge) signal demanding the transmitting section $T_t$ again to issue a series of data blocks headed by a data block corresponding to the erroneous data block. Namely, a backward signal including ACK and NAK signals are sent forth from the transmitting section $R_t$ of the receiving side 13 to the receiving section $T_r$ of the transmitting side 11. Forward and backward signals are conducted through a same line at frequencies falling within different bands. Obviously, forward and backward signals may be transmitted through separate lines.

There will now be described by reference to FIG. 2 a synchronization establishing system according to this invention. A first synchronization code $S_1$ is delivered from the transmitting section $T_t$ of the transmitting side 11 to the receiving section $R_r$ of the receiving side 13 through the transmission line 12 prior to data transmission. The first synchronization code $S_1$ reaches the receiving section $R_r$ of the receiving side 13 in a predetermined length of time which depends on the distance between the transmitting side and receiving side, the length of this transmission time or delay varying with the states of the transmission line. When the receiving section $R_r$ of the receiving side 13 receives the first synchronization code $S_1$ in a state free from an error, then the transmitting section $R_t$ of the receiving side 13 supplies the transmission side 11 with an ACK signal denoting that the first synchronization code has been received in an error-free state. Where, however, the first synchronization code $S_1$ is not detected by the receiving section $R_r$ of the receiving side 13, then the transmission side 11 sends forth a second synchronization code $S_2$ in a predetermined length of time $T_0$ after issue of the first synchronization code $S_1$ since the transmitting section of the receiving side 13 issues no ACK signal.

The time interval $T_0$ at which synchronization codes are sent forth in succession is chosen to be longer than a maximum of the time $T_1$ required for an ACK signal from the receiving side 13 corresponding to a synchronization code issued by the transmitting section $T_t$ of the transmitting side 11 to reach the receiving section $T_r$ thereof.

FIG. 2 represents the case where the first synchronization code $S_1$ was not detected by the receiving side 13. Under such condition, the transmitting side 11 does not receive an ACK signal from the receiving side 13 during the time interval $T_0$. Therefore, the transmitting side 11 sends forth a second synchronization code $S_2$ at the end of the time interval $T_0$. When the second synchronization code $S_2$ is detected by the receiving side 13, then the transmitting side 11 receives an ACK signal from the receiving side 13 in a time $T_1$ after issue of the second synchronization code $S_2$. Upon detection of the ACK signal, the transmitting side 11 issues required data blocks to the receiving side 13, starting with the point of time at which the succeeding synchronization code is to be sent forth.

If the second synchronization code $S_2$ is not detected by the receiving side 13, then the transmitting side 11 delivers a third synchronization code $S_3$. Thus, synchronization codes are sent forth from the transmitting side 11 repeatedly at the predetermined time interval $T_0$ until the transmitting side 11 detects an ACK signal issued from the receiving side 13. If an error occurs in the ACK signal during transmission thereof, then synchronization codes are also repeatedly issued.

The above-mentioned time interval $T_0$ may be chosen to have such a length as corresponds to eight data blocks each having a predetermined number of (for example, 515) bits.

There will now be described by reference to FIGS. 3 to 7 a data-transmission system based on the process of FIG. 2 for establishing data block synchronization. Throughout FIGS. 3 to 7, sections relative to retransmission of data blocks are omitted. A synchronization code generator 21 included in the transmitting section $T_t$ of the transmitting side 11 generates a synchronization code formed of, for example, eight bits. This synchronization code is conducted to a known modulator 23 through a gate circuit 22. A modulated output signal from the modulator 23 is sent to a transmission line 12 through a separator 24 formed of a hybrid transformer. In the receiving section $T_r$ of the transmitting side, a demodulator 25 and ACK signal detector 26 are provided on the output side of the separator 24. When the detector 26 detects an ACk signal sent forth from the receiving side 13 upon detection of a synchronization code delivered from the transmitting side 11, then the detector 26 supplies a signal to a control circuit 27 to control the gate circuit 22, thereby enabling data blocks read out of a data memory 28 to be supplied to the modulator 23 in place of the synchronization code, startng with the point of time at which the succeeding synchronization code is to be issued.

In the receiving side 13, a demodulator 32 is connected to the output of a separator 31 for separating forward and backward signals from each other. A synchronization code detector 33 is connected to the output of the demodulator 32. When detecting a synchronization code sent forth from the transmitting side 11, the synchronization code detector 33 enable an ACK signal generator 34 to issue ACK signal to the transmission line 12 through a modulator 35. In response to detection of the synchronization code, a control circuit 37 renders a gate 36 ON in a time $T_0$ corresponding to eight data blocks after detection of a synchronization code and delivers data blocks to a data-utilizing device.

Figure 5:
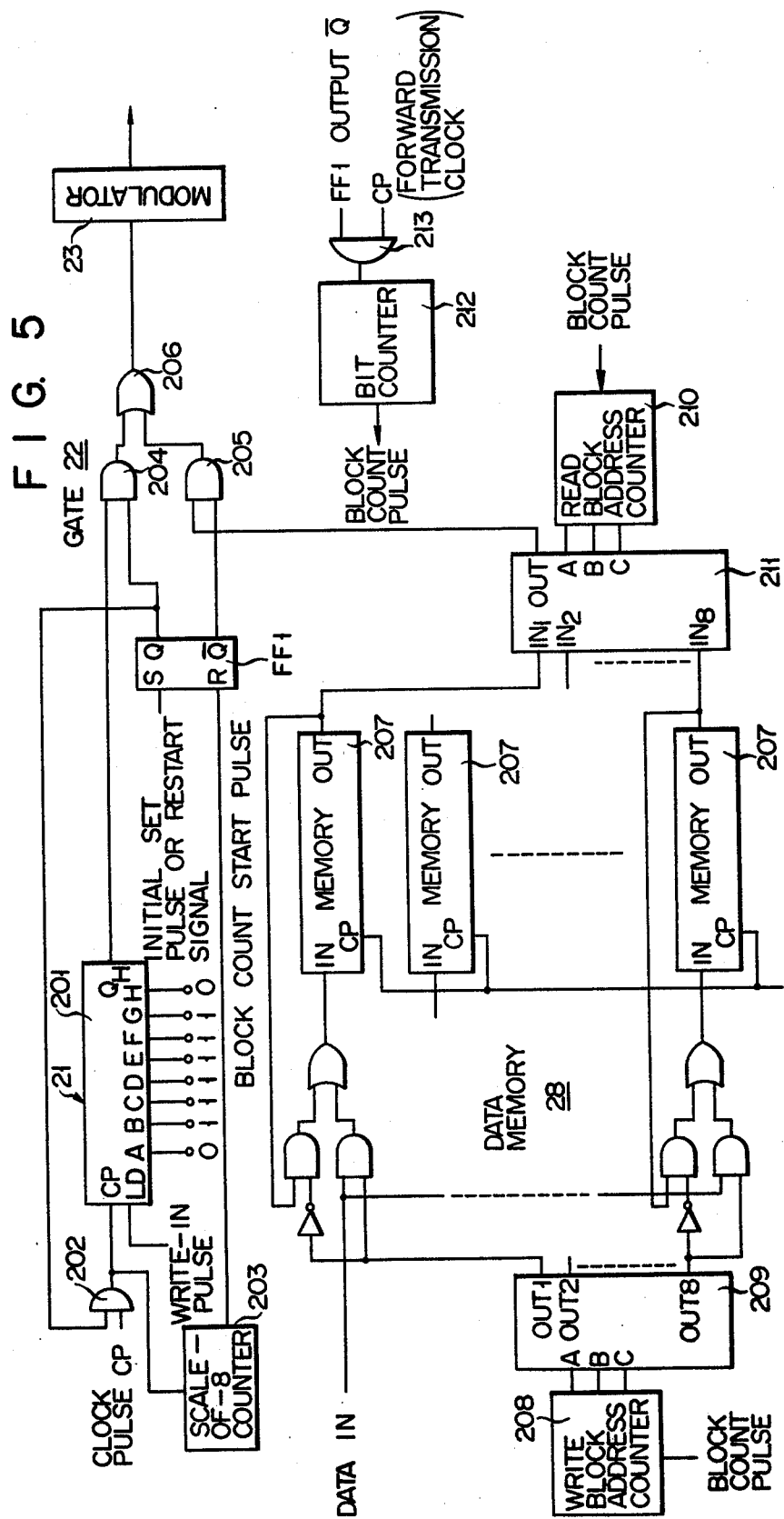
FIG. 5 is a detailed block diagram of one part of the data-transmitting section of FIG. 3.

Referring to FIG. 5, the synchronization code generator 21 is formed of a parallel-in serial-out shift register 201. With this shift register 201, a synchronization code (indicated by 01111110 in this embodiment) is written upon receipt of write-in pulse and the respective bits of the synchronization code are read out in succession in response to clock pulses CP. The clock pulses CP are supplied to the register 201 through an AND gate 202 enabled by a set output Q from a flip-flop circuit FF1. The flip-flop circuit FF1 is not only initially set but also set by a later described RESTART signal. The flip-flop circuit FF1 is reset by an output from an 8-scale counter 203 for counting output pulses of the AND gate 2:2. The 8-scale counter 203 is restored to the initial value when counting eight pulses from the AND gate 202. When counting eight pulses, the counter 203 produces a block count start pulse, which in turn resets the flip-flop circuit FF1.

While the flip-flop circuit FF1 is set, the set output Q thereof enables an AND gate 204 to supply a synchronization code to the modulator 33 through an OR gate 206. When the counter 203 counts 8, then the flip-flop circuit FF1 is reset to enable an AND gate 205. As the result, data clocks are applied from the data memory 28 to the modulator 23 through the OR gate 206

The data memory 28 comprises a plurality of recirculating shift registers 207 each capable of storing one data block; a demultiplexer 209 for selecting that register in which a data from a source is to be written, according to a count made by a write block address counter 208 and a multiplexer circuit 211 for selecting that register from which a data is to be read out, according to a count made by a read block address counter 210. An output from the multiplexer 211 is coupled to one of the inputs of the AND gate 205.

Referential numeral 212 denotes a bit counter, which counts clock pulses CP through an AND gate 213 enabled by a reset output $\overline{Q}$ of the flip-flop circuit FF1. The bit counter 212 issues one block count pulse, each time the counter 212 counts clock pulses of a number corresponding to a predetermined number of (for example 515) bits of each data block, starting with the point of time at which a synchronization code is sent forth.

Figure 6:
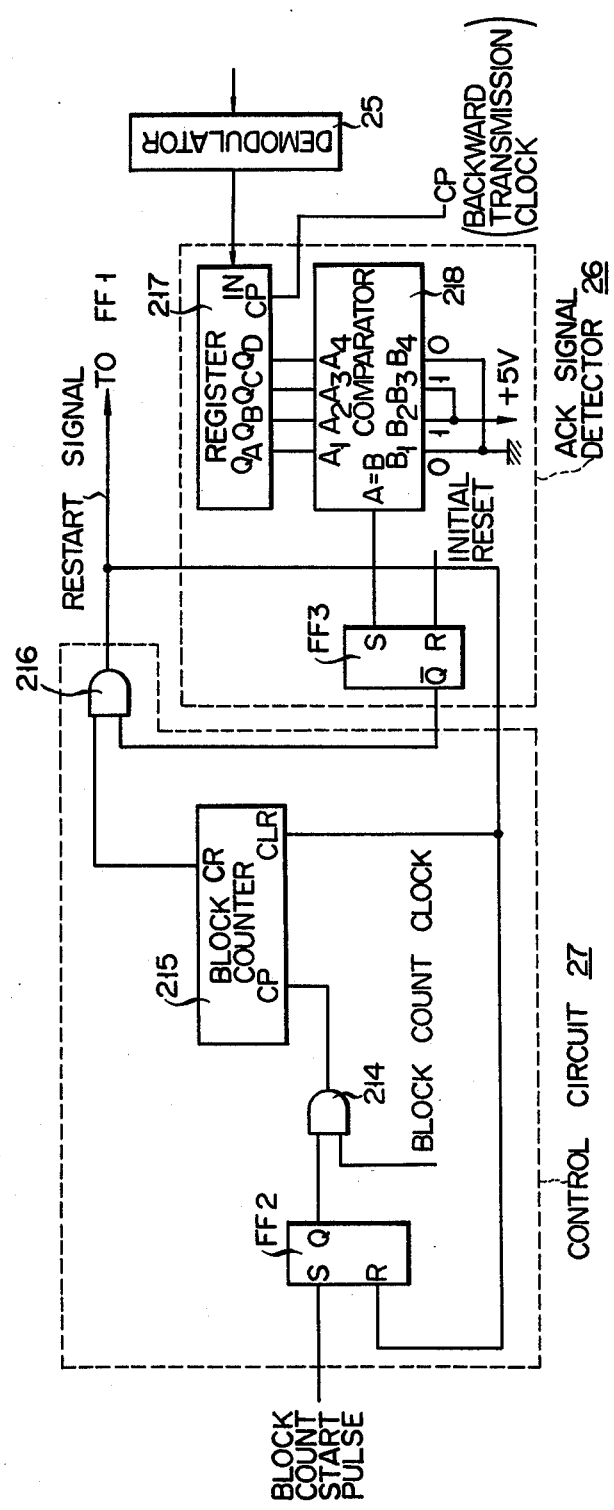
FIG. 6 is a detailed block diagram of the other part of the data-transmitting section of FIG. 3.

The output of the 8-scale counter 203 is also supplied to the set input of a flip-flop circuit FF2 included in the control circuit 27 of FIG. 6. Namely, the flip-flop circuit FF2 is set after a synchronization code is issued. Output pulses of the bit counter 212 are supplied to a block counter 215 through an AND gate 214 enabled by the set output Q of the flip-flop circuit FF2. The block counter 215 generates an output, each time the counter 215 counts eight block count pulses corresponding to eight data blocks. An output of the block counter 215 is coupled to one of the inputs of an AND gate 216.

The ACK signal detector 26 comprises a serial-in parallel-out shift register 217 coupled with the output of the demodulator 25; a comparator 218 for comparing an ACK code and outputs of shift register 217; and a flip-flop circuit FF3 which is set by an ouput from the comparator 218 when coincidence takes place between bit outputs of the register 217 and the ACK code. The flip-flop circuit FF3 is initially reset. The reset output $\overline{Q}$ of the flip-flop circuit FF3 is coupled to the other of the inputs of the AND gate 216. The output of the AND gate 216 is coupled to a clear terminal CLR of the block counter 215 and the reset input R of the flip-flop circuit FF2. FIG. 6 shows that the predetermined ACK code is "0110."

Figure 7:
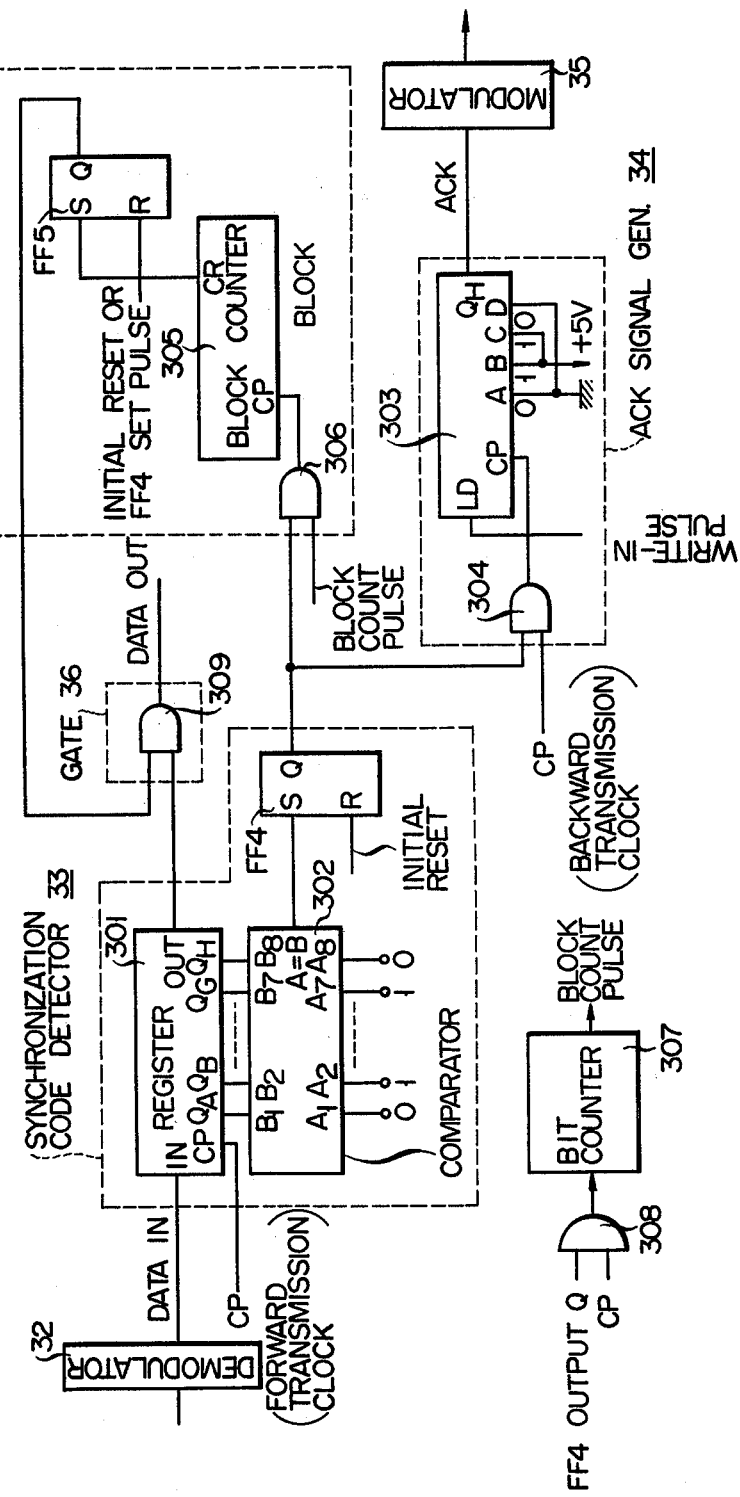
FIG. 7 is a detailed block diagram of the data-receiving section of FIG. 4.

The synchronization code detector 33 of the receiving side 13 comprises, as shown in FIG. 7, a serial-in parallel-out shift register 301 connected to the output of the demodulator 32; a comparator 302 for comparing 8-bit outputs of the shift register 301 and the predetermined synchronization code of "01111110" and a flip-flop circuit FF4 which is set by a coincidence output from the comparator 302.

The ACK signal generator 34 comprises a parallel-in serial-out shift register 303 in which an ACK code (0110) is written upon receipt of a write-in pulse and from which bit signals are successively sent forth to the modulator by clock pulses CP; and an AND gate 304 which is enabled by the set ouput Q of the flip-flop circuit FF4 to deliver clock pulses CP to the aforesaid shift register 303. Where a synchronization code is transmitted to the receiver 13 without an error, the flip-flop circuit FF4 is set, causing an ACK code to be transmitted from the receiver 13 to the transmitter 11.

The control circuit 35 comprises a block counter 305; an AND gate 306 which is enabled by the set output Q of the flip-flop circuit FF4 to cause block count pulses to be supplied from a bit counter 307 to the block counter 305; and a flip-flop circuit FF5 which is set by an output of the block counter 305. When counting eight block count pulses corresponding to eight data blocks, the block counter 305 sends forth a set signal to the flip-flop circuit FF5. The set output Q of the flip-flop circuit FF5 is coupled to one of the inputs of an AND gate 309, the other input of which is coupled with the output of the shift register 301.

The bit counter 307 counts clock pulses CP supplied through an AND gate 308 which is enabled by the set output Q of the flip-flop circuit FF4, and issues one block count pulse, each time 515 clock pulses are counted.

There will now be described the operation of the data-transmitting system of this invention. While the flip-flop circuit FF1 is set, a synchronization code is sent forth to the transmission line. When delivery of the synchronization code is brought to an end, the flip-flop circuit FF1 is reset to disable the AND gate 204 and enable the AND gate 205. At this time, block synchronization is not established, though data blocks are read out of the data memory 28. While the synchronization is not established, the data blocks read out of the memory may be arbitrary ones. Transmission of data may be stopped until the block synchronization is established. The bit counter 212 produces one block count pulse, each time 515 clock pulses are counted after issue of a synchronization code, namely, at each time interval required for 515 bits constituting one data block to be transmitted.

While an ACK code from the receiving side 13 is not detected, the flip-flop circuit FF3 remains reset. When the block counter 215 counts eight block count pulses after issue of the synchronization code, the flip-flop circuit FF1 is again set, causing the synchronization code to be again transmitted. A length of time required for the block counter 215 to count eight block count pulses after transmission of the synchronization code corresponds to the aforesaid time interval $T_0$. Namely, while no ACK code is detected, the synchronization code is repeatedly transmitted at the time interval $T_0$.

When the receiving side 13 detects a synchronization code, the flip-flop circuit FF4 is set. Therefore, the flip-flop circuit FF5 is set by an output of the block counter 305 in a length of time corresponding to eight data blocks after detection of a synchronization code, thereby enabling an AND gate 309. At a time interval $T_0$ after detection of a synchronization code, desired data are supplied to a data-utilizing device through the AND gate 309. The receiving side 13 sends an ACK code to the transmitting side 11 upon detection of a synchronization code. If an error occurs in the ACK code through transmission, the ACK code cannot be detected by the transmitting side 11. In this case, the transmitting side again transmits a synchronization code as in the case where the receiving side does not detect the synchronization code.

The foregoing description of the data-transmission system of this invention is based on the assumption that bit synchronization is established between the transmitting and receiving sides as in the prior art data-transmission system.

The data-transmission system of this invention, in which synchronization is intially established and data blocks each having a fixed length are continuously transmitted is improved in transmission efficiency and particularly adapted for transmission of a large amount of information as in facsimile transmission.

There will now be described the embodiment of this invention in which a data rate is controlled according to a block error rate of a transmission line. Now let it be assumed that V bits/s represents the rate at which a forward signal is transmitted; N bits a length of each block included in the forward signal; $\tau$ seconds a loop propagation time; and Pb a block error rate. Then the transmission efficiency $\eta$ may be expressed by the following equation:

$$\eta = \frac{1 - Pb}{1 + [\frac{\tau V}{N} + 1] \cdot Pb}$$

The loop propagation time $\tau$ is a time required from the transmission of a forward signal until the detection of a backward signal corresponding to the forward signal at the transmitting side. Referring to the above equation [ ] is the Gaussian notation.

Where the transmission line is degraded in quality, and its block error rate falls, it sometimes happens that a lower data rate rather more shortens a data transmission time.

Figure 8:
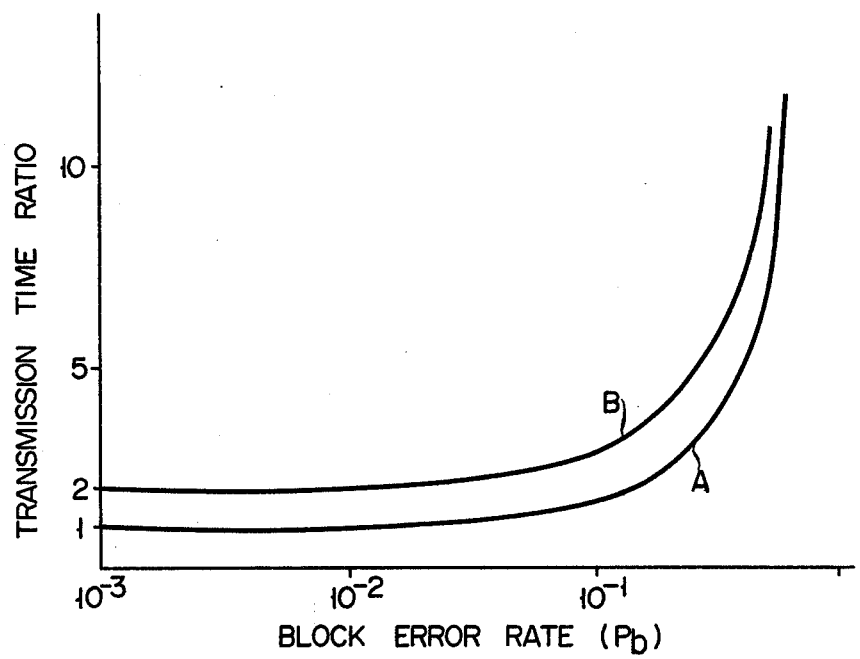
FIGS. 8 and 9 are diagrams showing comparison between data transmission efficiencies at different data rates.
Figure 9:
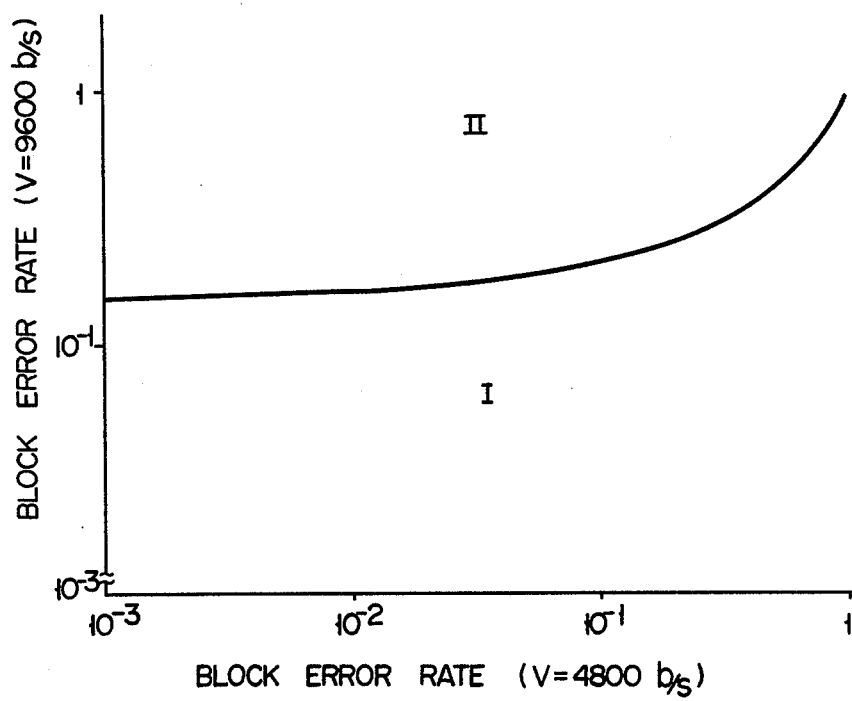

FIG. 8 shows a relationship between a transmission time and block error rate Pb with respect to data rates 9600 bits/s and 4800 bits/s. With data shown in FIG. 8, a transmission time at 9600 bits/s in case where no error occurs is taken to be 1. The transmission time is proportional to a reciprocal of the transmission efficiency $\eta$. Further, the length N of each block is 512 bits and the loop transmission time $\tau$ is 250 milliseconds. The curves A and B corresponds to data rates of 9600 bits/s and 4800 bits/s respectively. FIG. 9 shows a relationship between block error rates at the data rates of 9600 bits/s and 4800 bits/s with respect to the same transmission time. FIG. 9 represents that the data rate of 9600 bits/s is more efficient in a region I below the curve, whereas the data rate of 4800 bits/s is more efficient in a region II above the curve.

Figure 10:
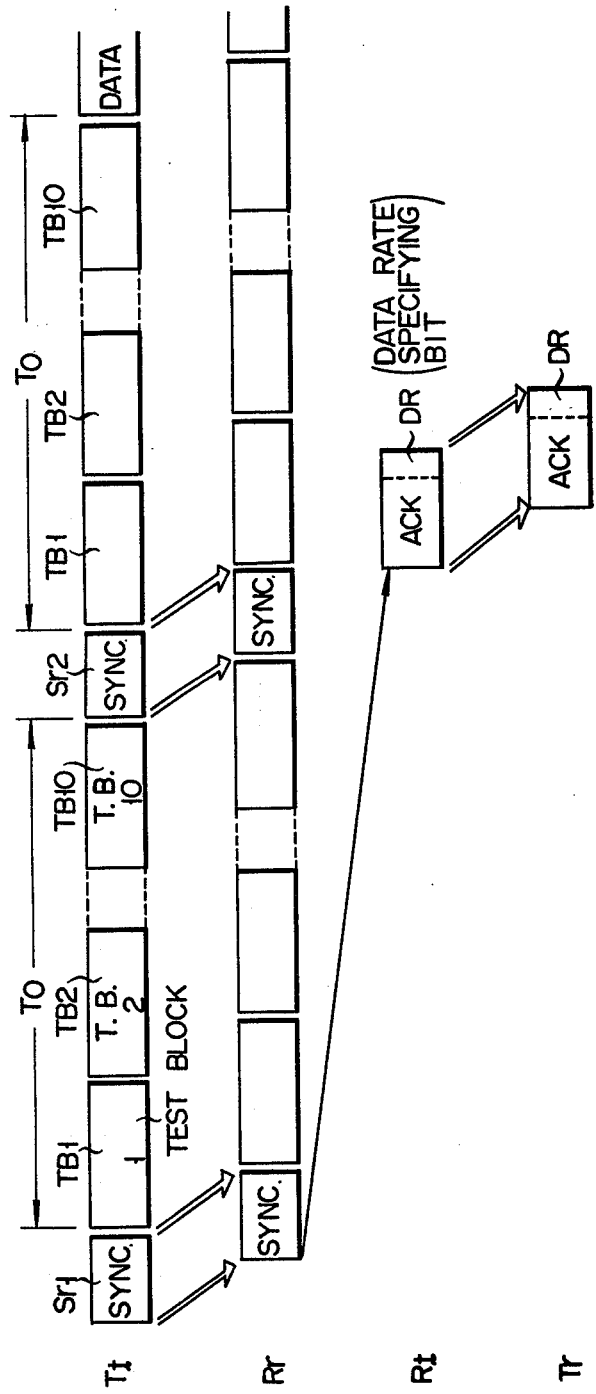
FIG. 10 is a diagram for explaining a data-transmitting system according to the second embodiment of the invention.

In practice, selection of either of the data rates of 9600 bits/s and 4800 bits/s is determined from a block error rate occurring at the higher data rate of 9600 bits/s. There will now be described by reference to FIG. 10 the data-transmission system of this invention which changes a data rate according to a block error rate.

Ten test data blocks $T_{B1}$ to $T_{B10}$ each comprising a 512-bit test data and three check bits are supplied from the transmitting side 11 to the receiving side 13 at the data rate of 9600 bits/s. When detecting a synchronization code, the receiving side 13 generates a synchronization code detection signal ACK. Further, the receiving side 13 examines a block error rate concerning the above-mentioned 10 test data blocks and produces a data rate-specifying one-bit signal DR. After supplied with the ACK and DR signals the transmitting side 13 commences data transmission at a rate corresponding to the DR signal. For example, where no or one block error takes place with respect to the 10 test data blocks received, the data rate of 9600 bits/s is maintained and where two or more block errors occur, then the data rate is changed from 9600 bits/s to 4800 bits/s. With the above-mentioned system, synchronization codes and test data blocks are repeatedly delivered from the transmitting side 11 to the receiving side 13, until the receiving side 13 detects a synchronization code.

There will now be described by reference to FIGS. 11 and 12 a second embodiment of this invention. A synchronization code generator 41 included in the transmitting section $T_t$ of the transmitting side 11 produces a synchronization code, which in turn is delivered to a modulator 43 through a gate circuit 42. A modulated signal from the modulator 43 is fed to the transmission channel 12 through a separator 44. Test data blocks produced by a test data generator 45 are applied to the modulator 43 through the gate circuit 42, after the transmission of a synchronization code. The test data blocks are also applied to an error check bit generator 46. This error check bit generator 46 counts a number of bits representing "1" included in a 512-bit test data block, and attaches the three least significant bits of the count as check bits after 512 bits of a test data block. Namely, a test data block consists of 512-bit test data and three check bits. In this embodiment, 10 test data blocks are transmitted from the transmitting side 11 to the receiving side 13 through the transmission line 12. The transmitting section Tr of the transmitting side 11 comprises an ACK signal detector 48 and NAK signal detector 49 both provided on the output side of a demodulator connected to a separator 44. When detecting a synchronization code detection signal ACK supplied from the receiving side 13, the ACK signal detector 48 delivers a signal to a control circuit 50, causing test data blocks to be fed from a data memory 51 to the modulator 43 through the gate circuit 42. Data blocks from the data memory 51 are also fed to the error check bit generator 46, which attaches three check bits after 512-bit data of each block. The ACK signal detector 48 selects a clock pulse signal with the bit rate of 4800 or 9600 b/s from a clock pulse generator 52 in response to the data rate-specifying signal DR. The data rate is determined from the bit rate of clocks used.

Figure 12:
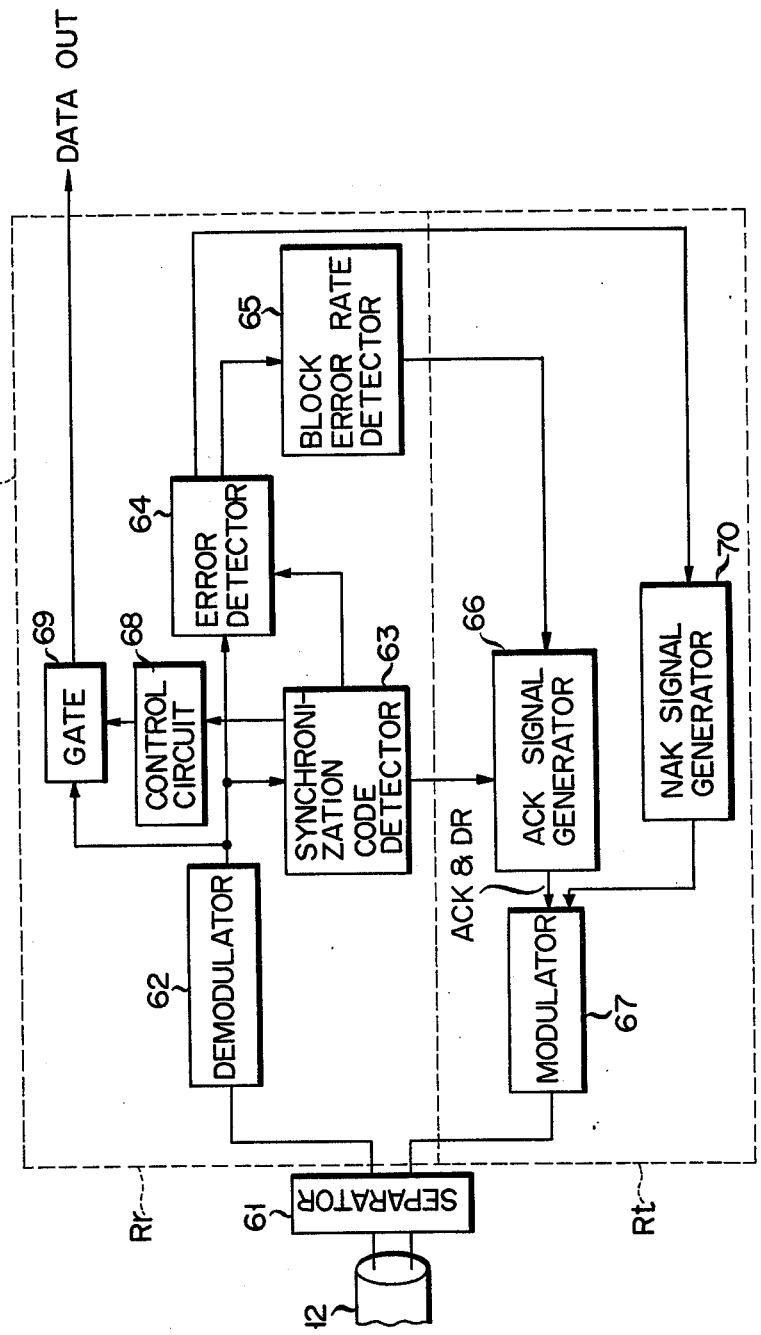
FIG. 12 is a schematic block circuit diagram of a data-receiving section of the second embodiment.

The receiving side 13 comprises, as shown in FIG. 12, a synchronization code detector 63 and error detector 64 both provided on the output side of demodulator 62 connected to a separator 61. When the synchronization code detector 63 detects a synchronization code transmitted from the transmitting side 11, the error detector 63 detects an error, if any, concerning the test data blocks following the synchronization code. A number of error-free ones among the test data blocks which is counted by a block error rate detector 65 is compared with a threshold value. In response to the synchronization code detector 63 and block error rate detector 65, an ACK signal generator 66 produces and sends a 3-bit synchronization code detection signal ACK and a 1-bit data rate-specifying signal DR to a modulator 67. When the synchronization code detector 63 detects a synchronization code, a control circuit 68 renders a gate 69 ON upon arrival of a data block to send the data block to a data-utilizing device. When the block error detector 64 detects an error in the data blocks, an NAK generator 70 supplies an NAK signal to the modulator 67. Upon receipt of the NAK signal, the transmitting side 13 again transmits a series of data blocks, starting with the error detected data block.

There will now be described by reference to FIGS. 13 to 15 the construction of the second embodiment shown in FIGS. 11 and 12. However, description is omitted with respect to the section used in the retransmission of data blocks which is not directly related to this invention. A synchronization code (01111110) stored in a parallel-in serial-out shift register 400 constituting the synchronization code generator 41 are successively read out by clock pulses CP through an AND gate 401 enabled by the set output Q of a flip-flop circuit FF10. The synchronization code thus read out is fed to the modulator 43 through an AND gate 402 being enabled by the set output Q of the flip-flop circuit FF10, OR gate 403, AND gate 404 and OR gate 405 in turn. An 8-scale counter 406 resets the flip-flop circuit FF10 and sets a flip-flop circuit FF11 after issue of a synchronization code.

A 512-bit test data block stored in a parallel-in serial-out shift register 407 constituting the test data generator 45 is successively read out by clock pulses CP supplied through an AND gate 408 which is enabled by the reset output $\overline{Q}$ of a flip-flop circuit FF12 and the set output Q of the flip-flop circuit FF11, and then fed to the modulator 43 through an AND gate 409 enabled by the set output Q of the flip-flop circuit 11, OR gate 410, AND gate 429, OR gate 403, AND gate 404 and OR gate 405 in turn. Test data block is also delivered to a counter 413 through an AND gate 411 enabled by the reset output $\overline{Q}$ of the flip-flop circuit FF10 in time with clock pulses CP applied to the AND gate 411 through an AND gate 412 enabled by the reset output $\overline{Q}$ from a flip-flop circuit FF12. The counter 413 counts a number of bits of "1" included in the test data block. The three least significant bits of the count value by the counter 413 are read in a parallel-in serial-out shift register 414. This process is performed for each test data block. A bit counter 415 counts clock pulses supplied through an AND gate 416 which is enabled by the reset output $\overline{Q}$ of the flip-flop circuit 10 after transmission of a synchronization code, sets the flip-flop circuit FF12 when counting 512 clock pulses and resets the flip-flop circuit FF12 when counting 515 clock pulses. After the bit counter 415 counts 512 clock pulses CP, namely, after a 512-bit test data block is fed to the modulator 43, three check bits stored in the shift register 414 upon receipt of clock pulses supplied through an AND gate 417 enabled by the set output Q of the flip-flop circuit FF12 are fed to the modulator 43 through an AND gate 418. After issue of the check bits, the flip-flop circuit FF12 is reset to enable the AND gate 408 fpr retransmission of test data blocks. Thus, 10 test data blocks each having 512 data bits and three check bits are continuously transmitted from the transmitting side 11 to the receiving side 13.

Count of 10 test data blocks is made by a block counter 418 (FIG. 14) which is supplied with an output (515) from the bit counter 415. When the block counter 418 counts 10, namely when the test data blocks are transmitted from the transmitting side 11 to the receiving side 13, then the block counter 418 generates a RESTART signal to set the flip-flop circuit FF10 and reset the flip-flop circuit FF11, thereby causing a synchronization code to be again transmitted. At this time, the flip-flop circuit 11 enables an AND gate 420. Since, however, an AND gate 421 is disabled by the output Q of a flip-flop FF13 no clock pulse CP is supplied to the data memory 51 with the result that no data is read out of the memory 51. The AND gate 421 is enabled by the output of an AND gate 424. Namely, data blocks from the memory 51 are not transmitted to the receiving side 13, until the transmitting side 11 detects an ACK signal delivered from the receiving side 13.

Figure 14:
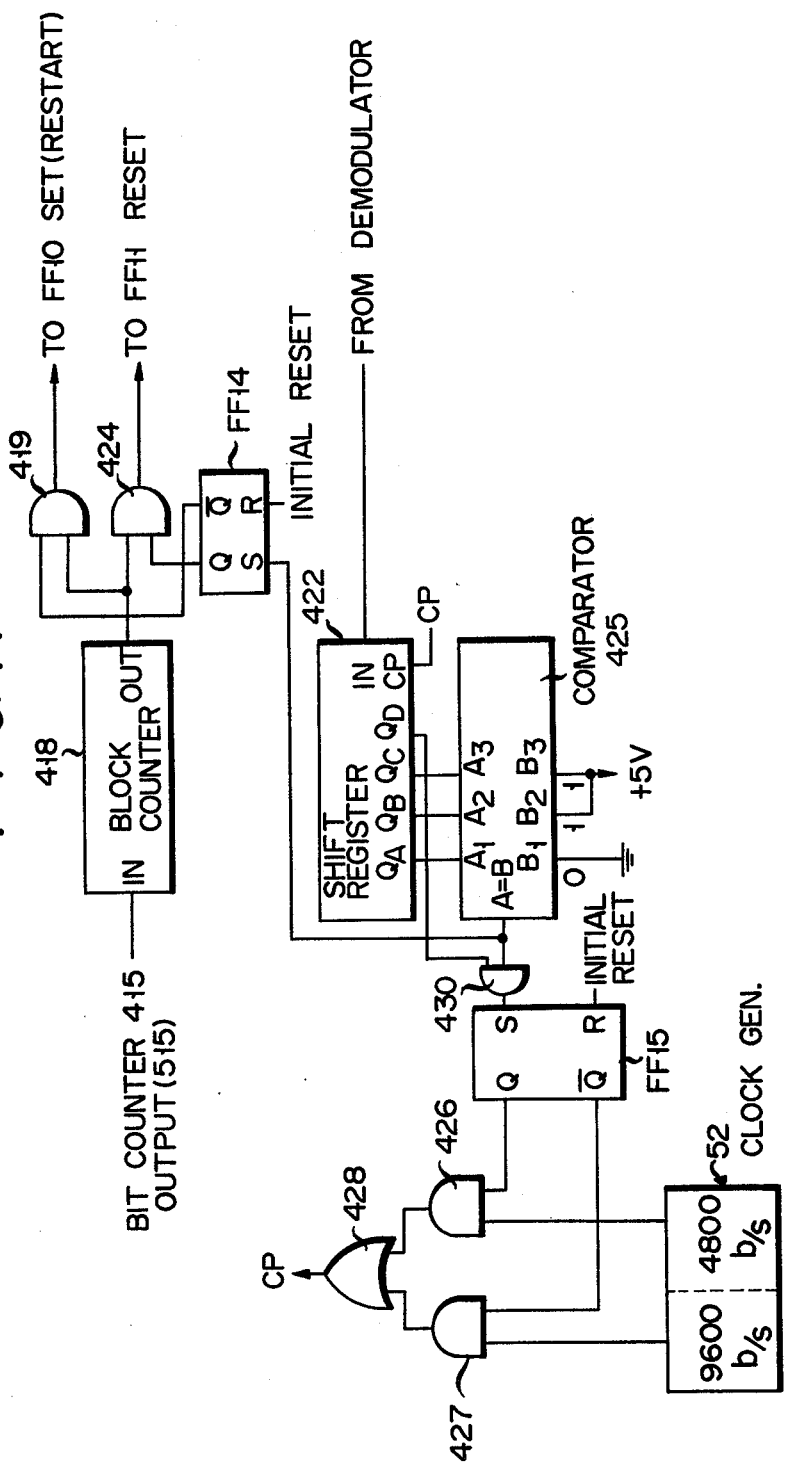
FIG. 14 is a detailed block diagram of the other part of the data-transmitting section of FIG. 11.
Figure 15:
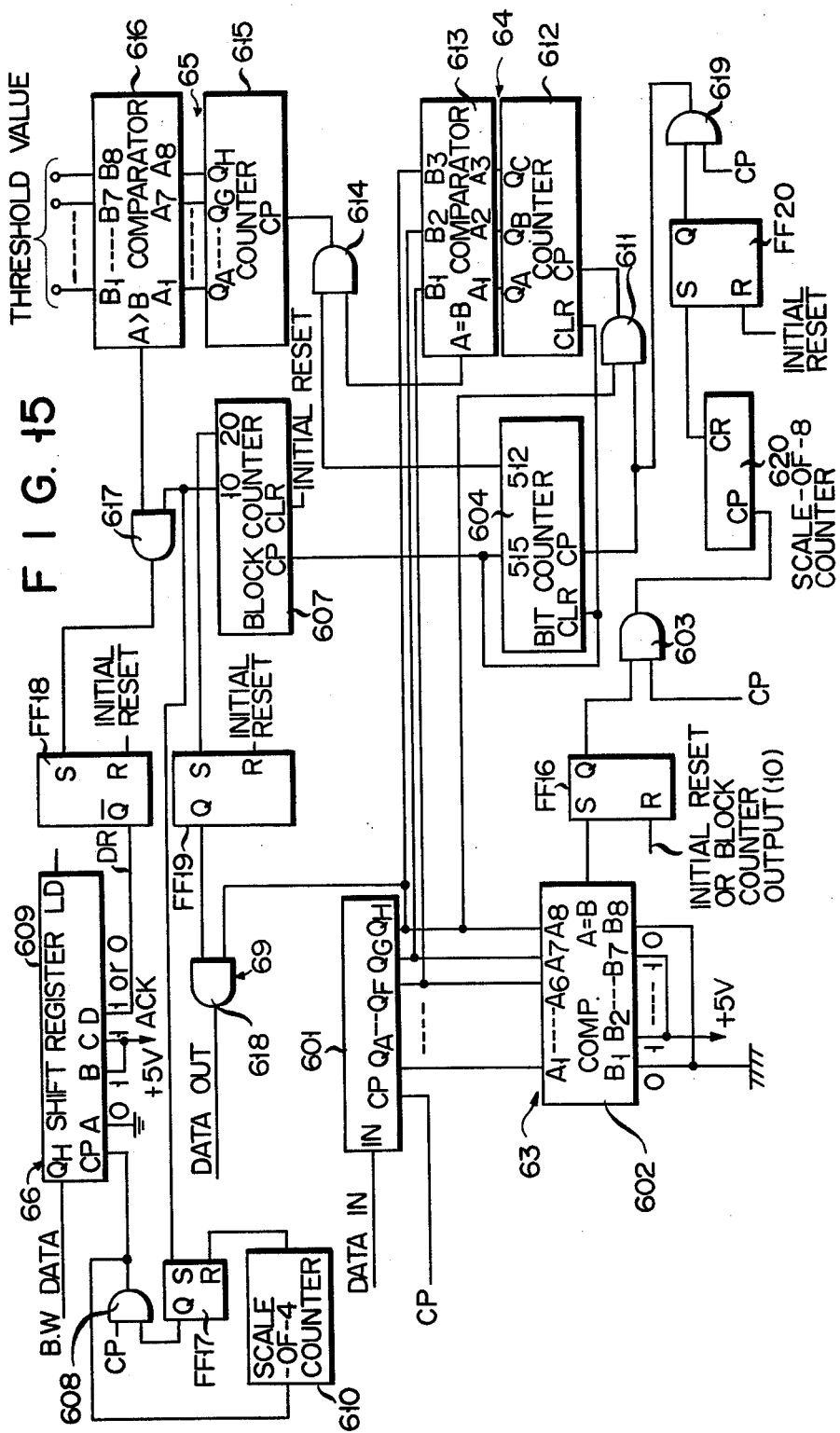
FIG. 15 is a detailed block diagram of the data-receiving section of FIG. 12.

A backward signal from the receiving side 13 is entered, as shown in FIG. 14, into a serial-in parallel-out shift register 422. The first 3 bits (representing an ACK signal) stored in the register 422 are supplied to a comparator 425. This comparator 425 compares the 3-bit outputs of the shift register 422 with the predetermined ACK code (011). When coincidence takes place between the 3-bit outputs and ACK code, the ACK-detecting flip-flop circuit FF14 is set to enable an AND gate 424 and disable an AND gate 419. When counting 10, the block counter 418 generates an output which in turn resets the flip-flop circuit 11 and sets the flip-flop circuit FF13 through the AND gate 424. Since AND gate 420 is enabled at this time, data blocks are continuously read out of the memory 51 by the clock pulses CP supplied through the AND gate 421 which is enabled by the set output Q of the flip-flop circuit FF13. Each data block (512 bits) from the memory is applied to the counter 413 with the result that three check bits is attached to the 512-bit data.

A backward signal issued from the receiving side 13 comprises a synchronization code detection signal ACK (011) and a data rate-specifying signal DR (1 or 0). A comparator 425 compares three bits read out of the shift register 422 with a predetermined code (011). When coincidence takes place between the three bits and predetermined code, an AND gate 403 is enabled by the coincidence output of the comparator 425. If, at this time, the $Q_D$ output of the register 422 is "1" a flip-flop circuit FF14 is set by the output of AND gate 430. This represents the case where the receiving side 13 has sent forth the DR signal of "1" to the transmitting side 11. When the flip-flop circuit FF15 is set, an AND gate 426 is enabled and an AND gate 427 is disabled. As the result, the clock pulses of 4800 b/s are selectively derived from the clock generator 52 through the AND gate 426 and OR gate 428. Where the data rate-specifying signal DR is "0," the flip-flop circuit FF15 is not set. At this time, the clocks of 9600 b/s are selectively derived from the clock generator 52.

There will now be described by reference to FIG. 15 the arrangement of the receiving side 13. A data demodulated by the demodulator 62 (FIG. 12) is conducted to a serial-in parallel-out shift register 601. A comparator 602 compares 8 bit outputs read out of the shift register 601 with the predetermined synchronization code of 01111110. Where coincidence takes place between both codes, an output from the comparator 602 sets a flip-flop circuit FF16 to enable an AND gate 603. The clock pulses are applied through AND gate 603 to an 8-scale counter 620 which issues an output after completion of 8-bit shift of the synchronization code in the register 601 to set a flip-flop circuit FF20. As a result an AND gate 619 is enabled to send clocks CP to a bit counter 604. The bit counter 604 counts clock pulses CP supplied the AND gate 619. The bit counter 604 has a first output at which an output pulse is produced, each time 512 clock pulses are counted and a second output at which one block count pulse is produced, each time 515 clock pulses are counted. A block counter 607 counts block count pulses supplied from the block counter 604. The block counter 607, when counting 10 block count pulses, sets a flip-flop circuit FF17 to enable an AND gate 608. As the result, ACK and DR signals read in a parallel-in serial-out shift register 609 are transmitted to the transmitting side 11 upon receipt of clock pulses CP. The flip-flop circuit FF17 is reset by an output of a 4-scale counter 610 which receives the clocks CP from the AND gate 608. Namely, when supplied with 10 test data blocks after detection of a synchronization code, the receiving side 13 transmits a synchronization code detection signal ACK and data rate-specifying signal DR to the transmitting side 11.

A bit output QH of the shift register 601 is coupled to a counter 612 through an AND gate 611 enabled by clock pulses from the AND gate 619, thereby effecting the counting of a number of "1" bits included in each test data block which arrives after detection of a synchronization code. The last three bits of a count value counted by the counter 612 are applied to a comparator 613 which are supplied with 3-bit outputs $Q_F$, $Q_G$, $Q_H$ of the register 601. Thus comparison is made in the comparator 613 between a number of "1" bits included in each test data block and the check bits. Where coincidence takes place, then an output of the comparator 613 enables an AND circuit 614. The first output (512) of the bit counter 604 is coupled to a counter 615 through the AND circuit 614. The comparator 613 compares a number of "1" bits included in each test data block and the check bits when the bit counter 604 counts 512 clock pulses. Where coincidence occurs between a number of "1" bits and the corresponding check bits, then the block counter 604 applies an output pulse (512) to the counter 615. This counter 615 counts a number of error-free test data blocks included in 10 test data blocks. The number counted by the counter 615 is compared with a predetermined threshold value by a comparator 616. Where a counted number of error-free test data blocks is larger than the threshold value, then the comparator 616 enables an AND gate 617. After, therefore, the receiving section 13 is supplied with ten test data blocks, an output (10) sets a flip-flop circuit FF18, setting a DR signal which is read in the shift register 609 to "0" instructing that a data rate be set at 9600 bits/s. As the result, the shift register 609 sends forth an ACK signal of "011" and a DR signal of "0" to the transmitting side 11. Where a counted number of error-free test data blocks is smaller than the threshold value, then the AND gate 617 is not actuated, and the flip-flop circuit 18 is not set. Accordingly, a DR signal of "1" instructing that a data rate be changed from 9600 bits/s to 4800 bits/s, is sent to the transmitting side.

An output 10 of the block counter 607 keeps the flip-flop circuit FF16 reset, until the succeeding synchronization code is detected by the receiving side 13. Upon detection of the succeeding synchronization code, the flip-flop circuit FF16 is set as described above, causing the bit counter 604 again to issue block count pulses. Where the block counter 607 counts 20, then a flip-flop circuit FF19 is set to actuate an AND gate 618. After, therefore, the receiving side 13 receives 20 test data blocks in succession to the synchronization code detected by the receiving side 13, data blocks are delivered to a data-utilizing device through the AND gate 618.

With the foregoing embodiment, a synchronization detection signal ACK and data rate-specifying signal DR are transmitted at the same time from the receiving side 13 to the transmitting side 11. However, the synchronization code detection signal ACK may be transmitted from the receiving side 11 to the transmitting side 13 immediately after detection of the synchronization code.

What we claim is:

1. A data-transmission system in which forward signals including synchronization codes and data blocks are transmitted from a transmitter to a receiver and backward signals including a synchronization code detection signal are transmitted from the receiver to the transmitter, both signals being carried through a transmission channel subject to variations in transmissions delay, the improvement comprising:

means for transmitting synchronization codes repeatedly at constant time interval from said transmitter to said receiver, until said transmitter detects a synchronization code detection signal from said receiver;

means responsive to detection of an error-free synchronization code at said receiver for transmitting a synchronization code detection signal from said receiver to said transmitter; and means responsive to detection of the synchronization code detection signal at said transmitter for commencing data transmission to said receiver starting with the point of time at which the succeeding synchronization code is to be transmitted.

2. The data-transmission system according to claim 1, wherein said time interval at which synchronization codes are repeatedly transmitted from said transmitter to said receiver is made longer than a maximum length of time required for said transmitter to receive a synchronization code detection signal corresponding to a synchronization code after said transmitter transmits said synchronization code.

3. A data-transmission system in which forward signals including synchronization codes and data blocks are transmitted from a transmitter to a receiver and backward signals including a synchronization code detection signal is transmittted from said receiver to said transmitter through a transmission channel subject to variations in transmission delay, the improvement comprising:

means for transmitting synchronization codes repeatedly at a constant time interval from said transmitter to said receiver until said transmitter detects a synchronization code detection signal from said receiver;

means for transmitting a plurality of test data blocks each including a test data and error check bits during the time interval between two adjacent synchronization codes from said transmitter to said receiver;

means responsive to detection of an error-free synchronization code at said receiver for transmitting a synchronization code detection signal from said receiver to said transmitter;

means responsive to detection of said synchronization code detection signal at said transmitter for transmitting data blocks from said transmitter to said receiver, starting with the point of time at which said transmitter transmits the succeeding synchronization code;

error rate-detecting means for detecting an error rate concerning test data blocks received by said receiver;

means responsive to said error rate-detecting means for transmitting a data-rate specifying signal from said receiver to said transmitter; and means responsive to detection of said data-rate specifying signal at said transmitter for controlling the rate at which data are transmitted from said transmitter to said receiver.

* * * * *